July 5, 1960
W. K. BROWN
2,944,158
PULSE GENERATOR
Filed Dec. 20, 1956
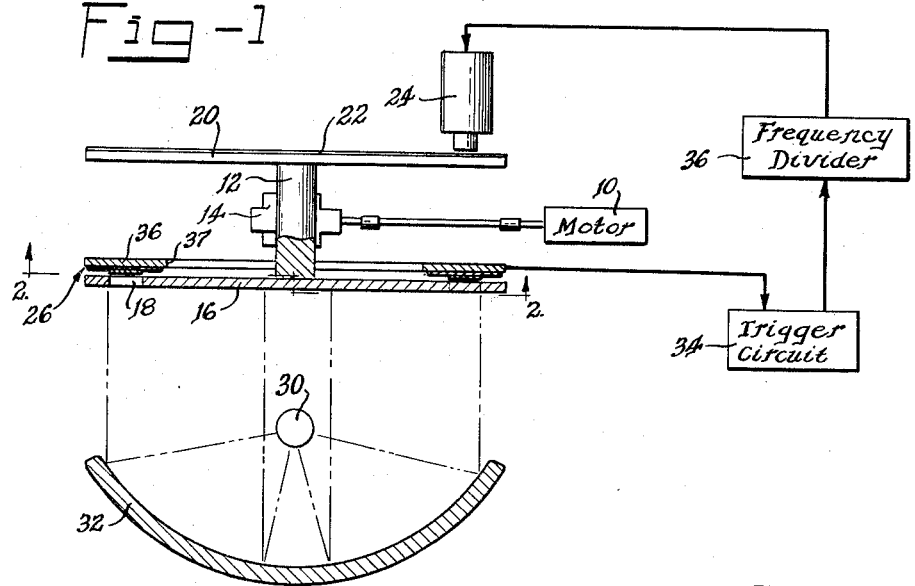
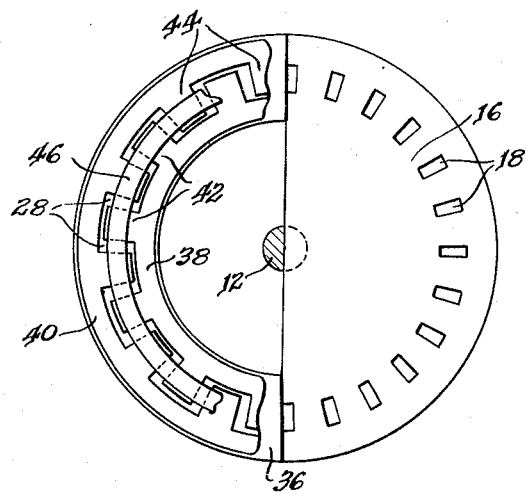
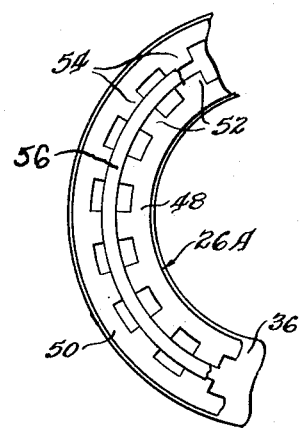
INVENTOR.
Wilfred K. Brown
BY
Graf, Nierman & Burmeister
Attorneys

United States Patent Office 2,944,158
Patented July 5, 1960

2,944,158

PULSE GENERATOR

Wilfred K. Brown, Cincinnati, Ohio, assignor to The Baldwin Piano Company, Cincinnati, Ohio, a corporation of Ohio Filed Dec. 20, 1956, Ser. No. 629,546

11 Claims. (Cl. 250—233)

The present invention relates generally to devices for generating electrical pulses, and more specifically to mechanically controlled devices for generating electrical pulses.

There are many devices which require electrical pulses to be generated in synchronism with a mechanical movement, such as the rotational position of a shaft. For example, a gasoline engine distributor employs electrical contacts to set up pulses for the spark plugs of the gasoline engine responsive to the rotational position of the drive shaft of the engine. A more accurate device for synchronizing electrical pulses with the angular position of a rotatable shaft employs a disc coaxially mounted about the shaft, the disc being provided with an annular track containing a plurality of transparent sectors separated by opaque sectors. A light source is positioned on one side of the disc confronting the track, and a photocell confronts the opposite side of the track. In this manner, electrical pulses are produced by the photocell for each transparent sector of the track on the disc, and the pulses produced are directly synchronized with the angular position of the shaft.

The accuracy with which the electrical pulses are correlated to the angular position of the shaft of such a device is limited principally by the accuracy with which the opaque and transparent sectors are disposed upon the disc. It is one of the objects of the present invention to provide a device for generating electrical pulses synchronized with the angular position of the shaft which employs a disc and photocell in which inaccuracies in the location of the opaque and transparent sectors of the track do not appreciably limit the accuracy of the pulse generator.

The inventor achieves this object of his invention by providing a novel photocell assembly which has a separate photocell for each of the transparent sectors of the track of the disc, the photocells being approximately equally spaced from each other and the photocell assembly directly confronting the entire track of the disc. A light source is provided to illuminate the entire track of the disc, so that all of the photocells produce an electrical response simultaneously.

It is a further object of the present invention to provide a photocell assembly having a plurality of photocells disposed in an annular equally spaced pattern.

For purposes of illustration, the present invention is disclosed as a portion of a machine for photographically exposing sectors on a photographic disc, although it is to be understood that the invention may be practiced with totally unrelated equipment. As illustrated:

Figure 1 is a view partly in section and partly schematic, of a pulse generator constructed according to the teachings of the present invention;

Figure 2 is a sectional view taken along the line 2—2 of Figure 1; and

Figure 3 is a sectional view of a modified form of the invention taken on a plane similar to that of the left portion of Figure 2.

As illustrated in Figure 1, the sector exposing machine includes a constant speed motor 10, preferably of the synchronous type, coupled to a shaft 12 through a gear box 14. A member, or disc 16, is secured coaxially to the shaft 12 and is provided with a plurality of equally spaced transparent sectors of equal length in the form of slots 18 disposed in a circular orbit adjacent to the periphery of the disc 16. A turntable 20 is coaxially secured to one end of the shaft 12, and is employed to rotate at a constant rate a photographic film 22 disposed on the upper surface of the turntable 20.

One of the purposes of the sector exposing machine is to produce discs with annular tracks containing spaced transparent sectors separated by opaque sectors. This is accomplished by modulating a beam of light at a rate synchronized with the rotation rate of the turntable 20 to photographically expose the transparent sectors of the film 22. For this purpose, a lamp and light modulator 24 is positioned over the film 22 adjacent to the periphery thereof to expose the track on the film. The lamp and light modulator produces a light flash in response to each electrical pulse impressed thereon.

A photocell assembly 26 is disposed in a fixed position adjacent to the upper surface of the disc 16, and the photocell assembly 26 has a plurality of photocells 28 which are disposed in an orbit confronting the slots 18 in the disc 16. There are an equal number of photocells 28 to the number of slots 18 in the disc 16, and since both the photocells 28 and slots 18 are equally spaced, the slots and photocells are periodically brought into alignment with rotation of the disc 16.

The disc 16 is continuously illuminated by a light source, such as a lamp 30, disposed on the axis of the shaft 12 confronting the side of the disc 16 opposite to the photocell assembly 26. All of the slots 18 in the disc 16 receive continuous illumination, and the illumination is intensified by a parabolic mirror 32 positioned on the opposite side of the lamp 30 to reflect light on the disc 16.

The photocell assembly 26 is electrically connected to a trigger circuit 34 which produces an electrical pulse of standard wave form and amplitude responsive to each pulse received from the photocell assembly 26. The output of the trigger circuit 34 is connected to the lamp and light modulator 24 to actuate the lamp and light modulator 24 responsive to each pulse from the photocell assembly 26 and trigger circuit 34. If less transparent sectors are to be exposed upon the photographic film 22 than the number of slots 18 in the disc 16, a frequency divider 36 is employed between the trigger circuit 34 and the lamp and light modulator 24.

The photocell assembly 26 employs an annular plate 36 of electrically insulating material, such as glass. This plate 36 has an axial opening 37 and is stationarily disposed above and adjacent to the disc 16. First and second electrically conducting rings 38 and 40 are coaxially disposed upon the surface of the plate 36 confronting the disc 16. The first ring 38 is disposed within the second ring 40 and has a plurality of spaced ribs 42 which extend radially outward from the first ring 38. All portions of the outer ring 40 are spaced from the inner ring 38, and the outer ring 40 has an equal number of ribs 44 to that of the inner ring 38, and the ribs 44 extend radially inward from the outer ring 40 centrally between the ribs 42 of the inner ring 38. The ribs 44 are spaced from all portions of the inner ring 38, so that the rings 38 and 40 are electrically insulated from each other. A ribbon 46 of photoconductive material is disposed in an annular path over and between the ribs 42 and 44 of the inner ring 38 and the outer ring 40. This ribbon 46 of photoconductive material directly confronts the slots 18 in the disc 16. The most suitable materials for the photoconductive ribbon 46 have been found to be of the semiconductor class. Cadmium selenide, cadmium sulfide, lead sulfide, lead selenide, zinc selenide, zinc sulfide, zinc telluride, cadmium telluride, germanium, silicon and lead telluride have been found to be suitable materials.

When it is desired to produce exposed sectors on the photographic film 22, the motor 10 is actuated, thus rotating the turntable 20 at a constant rate. Since the disc 16 is mechanically connected to the turntable 20 by the shaft 12, the disc 16 rotates at a rate identical to that of the turntable 20. As a result, the slots 18 periodically become aligned with the photocells 28 of the photocell assembly 26, since the photocell assembly 26 is stationary relative to the disc 16. The photocells thus become periodically illuminated by the lamp 30 and reflector 32, and all of the photocells 28 are illuminated at the same time. Likewise, all the photocells 28 are disposed in the dark simultaneously. As a result, the electrical resistance of the photocells 28 in the photocell assembly is periodically reduced during period of illumination.

The electrical signal produced by these variations in the interelectrode impedance of the photocells is conducted from the inner ring 38 and outer ring 40 to the trigger circuit 34, and the trigger circuit 34 produces a pulse of uniform amplitude and wave form for each pulse received from the photocell assembly 26. This pulse from the trigger circuit 34 is employed to actuate the lamp and light modulator 24, thereby exposing the photographic film 22 with a beam of light each time the photocells 28 become aligned with the slots 18 in the disc 16.

The photocell assembly 26 is fabricated by printing the inner ring 38 and outer ring 40 on the plate 36 of electrically insulating material. A suitable material for the inner ring 38 and outer ring 40 is Inconel, and a suitable material for the plate 36 is glass. The photoconductive ribbon 46 is then positioned over the ribs 42 and 44 of the inner ring 38 and outer ring 40.

The light sensitive areas of the photocell assembly 26 occur between each pair of confronting ribs 42 and 44, and it is only the illumination of this region which results in a change in the interelectrode impedance of the photocell assembly 26. Since it is desired to confine the sensitive regions of the photocell assembly to specific radial regions, care must be exercised to prevent the ribbon 46 of photoconductive material from overlapping the region between the end of one of the ribs 42 or 44 and the confronting portion of the inner ring 38 or outer ring 40.

The photocell assembly illustrated in Figure 3, and designated 26a, also employs the plate 36 of electrically insulating material. An inner electrically conducting ring 48 is disposed on the surface of the plate 36 confronting the disc 16, and an outer electrically conducting ring 50 is disposed coaxially about the inner ring 48 in spaced insulated relationship therewith. The inner ring 48 is provided with a plurality of equally spaced ribs 52 which extend radially outward therefrom. In like manner, the outer ring 50 is provided with an equal number of equally spaced ribs 54 which extend radially inward from the outer ring 50 and are radially aligned with the ribs 52 of the inner ring 48. The ends of the ribs 52 and 54 are spaced from each other, and a ribbon 56 of photoconductive material is disposed between and in contact with each of the ribs 52 and 54. This ribbon 56 may be constructed of the same material as the ribbon 46, and the inner and outer rings 48 and 50 may also be constructed of the same material and in the same manner as the inner and outer rings 38 and 40 of the photocell assembly 26 previously described.

In the embodiment of the photocell assembly 26, illustrated in Figure 2, the sensitive regions of the photocells 28 are defined by the distance by which each rib 42 is spaced from the adjacent ribs 44. The inventor has found that this spacing may be extremely small, such as 0.0002 inch. Also, the length of this region need not be large, 0.0625 inch being sufficient. In the photocell assembly 26a, illustrated in Figure 3, the sensitive regions of the photocell are the regions defined by the arc length of the ribs 52 and 54. The arc lengths of the ribs 52 and 54 may be made extremely short, such as 0.0007 inch long, and the distance between ribs 52 and 54 may also be short, for example 0.0002 inch. Since the sensitive regions of the photocells in the assembly 26 and the photocell assembly 26a may be made of approximately the same length, the photocell assemblies 26 and 26a achieve approximately the same angular resolution. However, the photocell assembly illustrated in Figure 2 has a larger cross sectional area between the ribs 42 and 44 than the cross sectional area between the ribs 52 and 54 of the photocell assembly 26a. For this reason, the ratio of the dark resistance to light resistance of the photocell assembly 26 is much greater than that of the photocell assembly 26a.

One method of fabricating the photocell assemblies 26 and 26a is to produce the ribs 42 and 44, or 52 and 54, on a sector exposing machine, such as that illustrated in Figure 1. Opaque and transparent sectors are thus provided on a photographic film, such as 22, in the form of a negative. A coating of Inconel is then placed on a glass disc and a layer of photo resist placed on the Inconel. The photo resist is then exposed with the pattern of the film, and then etched to form the Inconel electrodes. The photoconductive ribbon is then deposited on the ribs of the Inconel electrodes.

It is to be noted that small errors in the angular position of the slots 18 in the disc 16, or in the angular position of the sensitive region of the photocells, are averaged out. Such errors affect the wave form of the pulses produced by the photocell assembly, but do not appreciably affect the uniformity of rate with which they occur.

The foregoing disclosure emphasizes the present invention applied to coordination of electrical pulses and rotational mechanical movements. However, it is to be noted that even though the invention is particularly advantageous in this form, some of the advantages of the invention are also achieved when applied to coordination of electrical pulses and rectilinear mechanical movements.

From the foregoing disclosure, the man skilled in the art will readily devise many modified structures and improvements upon the disclosed construction which are intended to be within the scope of this invention. For example, the invention is illustrated with an equal number of photocells 28 and slots 18 in the disc 16, whereas the invention can be practiced with different numbers of slots and photocells as long as an integral relationship exists, i.e., the ratio can be expressed as an integer. It is therefore intended that the scope of the present invention be not limited by the foregoing disclosure, but rather only by the appended claims.

The invention claimed is:

1. A device for generating electrical pulses responsive to the rotational position of a shaft comprising an assembly of equally spaced photocells disposed equidistant from a common point having a first ring of electrically conducting material having a plurality of equally spaced radial ribs extending outwardly therefrom, a second electrically conducting ring having an equal number of equally spaced radial ribs extending inwardly therefrom, the second ring being disposed coaxially about the first ring and the ribs of the second ring being disposed centrally between the ribs of the first ring and spaced therefrom, and a mass of light sensitive semiconductor material disposed between the confronting ribs of the two rings and in contact with said ribs, a disc adapted to be mechanically coupled to the shaft and disposed adjacent to the photocell assembly having transparent sectors equal in number to the ribs of the rings and disposed in a circular orbit confronting the ribs of the photocell assembly and separated by opaque sectors, and means disposed on the side of the disc opposite the photocell assembly to illuminate the disc, whereby the photocell assembly responds to illumination when the transparent sectors of the disc are aligned with the regions between the ribs of the photocell assembly.

2. A device for generating electrical pulses responsive to the rotational position of a shaft comprising an assembly of equally spaced photocells disposed equidistant from a common point having a first ring of electrically conducting material with a plurality of equally spaced radial ribs extending outwardly therefrom, a second electrically conducting ring having an equal number of equally spaced radial ribs extending inwardly therefrom, the second ring being disposed coaxially about the first ring and the ribs of the second ring being disposed centrally between the ribs of the first ring and spaced therefrom, and a mass of light sensitive semiconductor material disposed between the confronting ribs of the two rings and in contact with said ribs, a disc adapted to be mechanically coupled to the shaft and disposed adjacent to the photocell assembly having transparent sectors equal in number to the ribs of the rings, means disposed on the side of the disc opposite the photocell assembly to illuminate the disc, and a trigger circuit having an input connected to the electrically conducting rings of the photocell assembly, said trigger circuit producing a pulse in response to each pulse from the photocell assembly.

3. A pulse generator comprising an assembly of equally spaced photocells disposed equidistant from a common point having a first ring of electrically conducting material with a plurality of equally spaced radial ribs extending outwardly therefrom, a second electrically conducting ring having an equal number of equally spaced radial ribs extending inwardly therefrom, the second ring being disposed coaxially about the first ring and the ribs of the second ring being disposed centrally between the ribs of the first ring, and a mass of light sensitive semiconductor material disposed between the confronting ribs of the two rings and in contact with said ribs, a disc adapted to be mechanically coupled to the shaft and disposed adjacent to the photocell assembly having transparent sectors equal in number to the ribs of the rings separated by opaque sectors, said sectors being disposed in a circular orbit confronting the ribs of the photocell assembly, means disposed on the side of the disc opposite the photocell assembly to illuminate the disc, and means to rotate the disc including a constant speed motor.

4. A pulse generator comprising the elements of claim 1 wherein the means to illuminate the disc includes a lamp and a parabolic mirror, the lamp being disposed between the mirror and the disc.

5. A photocell assembly comprising a first ring of electrically conducting material having a plurality of equally spaced radial ribs extending outwardly therefrom, a second electrically conducting ring having an equal number of equally spaced ribs extending radially inwardly therefrom, the second ring being mounted coaxially about the first ring and the ribs thereof being disposed centrally between the ribs of the first ring, and a mass of light sensitive semiconductor material disposed between the confronting ribs of the two rings and in contact with said ribs, other portions of the rings being electrically insulated from each other.

6. A photocell assembly comprising a plate of electrically insulating material, a first ring of electrically conducting material disposed upon one surface of the plate, said first ring having a plurality of equally spaced radial ribs extending outwardly therefrom, a second electrically conducting ring having an equal number of equally spaced radial ribs extending inwardly therefrom, said ring being disposed coaxially about the first ring on the surface of the plate with the ribs thereof disposed centrally between the ribs of the first ring, and a ribbon of light sensitive semiconductor material disposed on the ribs of the two rings and the plate, other portions of the rings being electrically insulated from each other.

7. A device for generating electrical pulses responsive to the rotational position of the shaft comprising an assembly of spaced photocells including a first ring of electrically conducting material having a plurality of equally spaced radial ribs extending outwardly therefrom, a second electrically conducting ring having an equal number of equally spaced radial ribs extending inwardly therefrom radially aligned with the ribs of the first ring and spaced therefrom, and a mass of light sensitive semiconductor material disposed between each pair of aligned ribs and in contact with said ribs, a disc adapted to be mechanically coupled to the shaft and disposed adjacent to the photocell assembly having transparent sectors equal in number to the ribs of the rings and separated by opaque sectors, said transparent sectors being disposed in a circular orbit confronting the ribs of the photocell assembly, and means disposed on the side of the disc opposite to the photocell assembly to illuminate the disc, whereby the photocell assembly responds to illumination when the transparent sectors of the discs are aligned with the ribs.

8. A photocell assembly comprising a plate of electrically insulating material, a first ring of electrically conducting material disposed upon one surface of said plate, said ring having a plurality of equally spaced radial ribs extending radially outwardly therefrom, a second electrically conducting ring disposed on said surface of the plate having an equal number of spaced ribs extending radially inward therefrom aligned with and spaced from the ribs of the first ring, and a ribbon of light sensitive semiconductor material disposed on the ribs of the first and second rings and the plate, said ribbon following an annular course and extending between each pair of confronting ribs, other portions of the rings being electrically insulated from each other.

9. A device for generating electrical pulses responsive to the rotational position of a shaft comprising an assembly of spaced photocells having a first ring of electrically conducting material having a plurality of equally spaced radial ribs extending outwardly therefrom, a second electrically conducting ring having an equal number of equally spaced radial ribs extending inwardly therefrom, the second ring being disposed coaxially about the first ring and the ribs of the second ring confronting and being spaced from the ribs of the first ring, a mass of light sensitive semiconductor material disposed between the confronting ribs of the two rings and in contact with said ribs, a disc adapted to be mechanically coupled to the shaft disposed adjacent to the photocell assembly having transparent sectors disposed in a circular orbit confronting the ribs of the photocell assembly and separated by opaque sectors, the number of ribs of each of the rings and the number of transparent sectors of the disc being related by an integer, and means disposed on the side of the disc opposite the photocell assembly to illuminate the disc.

10. A photocell assembly comprising a first ring of electrically conducting material having a plurality of equally spaced radial ribs extending outwardly therefrom, a second electrically conducting ring having an equal number of equally spaced radial ribs extending inwardly therefrom, the second ring being disposed coaxially about the first ring and the ribs of the second ring confronting and being spaced from the ribs of the first ring, and a mass of light sensitive semiconductor material disposed between the confronting ribs of the two rings and in contact with said ribs, other portions of the rings being electrically insulated from each other.

11. A photocell assembly comprising the elements of claim 10 wherein the light sensitive semiconductor material comprises a composition formed of a first material of the class consisting of cadmium, lead and zinc and a second material of the class consisting of selenium, sulphur and tellurium.

References Cited in the file of this patent

UNITED STATES PATENTS

| | | |
|---|---|---|
| 1,802,803 | Best | Apr. 28, 1931 |
| 2,448,518 | Cashman | Sept. 7, 1948 |
| 2,506,599 | Jordan | May 9, 1950 |
| 2,648,782 | Argabrite | Aug. 11, 1953 |
| 2,728,835 | Mueller | Dec. 27, 1955 |
| 2,742,550 | Jenness | Apr. 17, 1956 |
| 2,768,310 | Kazan et al. | Oct. 23, 1956 |
| 2,776,357 | Porath | Jan. 1, 1957 |
| 2,789,193 | Anderson | Apr. 16, 1957 |
| 2,818,531 | Peek | Dec. 31, 1957 |

OTHER REFERENCES

Walker: Photoelectric Cells in Industry, Pitman Publishing Co., New York, N.Y., published in 1948, page 5.